United States Patent
Chontos et al.

(10) Patent No.: US 7,667,923 B1
(45) Date of Patent: Feb. 23, 2010

(54) HARD DRIVE DATA PLATTER IMPAIRMENT TOOL

(75) Inventors: John D. Chontos, Raleigh, NC (US); Edward J. Grenchus, Jr., Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/498,919

(22) Filed: Jul. 7, 2009

(51) Int. Cl.
*G11B 33/00* (2006.01)

(52) U.S. Cl. .................... 360/97.01; 360/137; 29/283.5

(58) Field of Classification Search .............. 360/97.01, 360/137; 83/684; 369/83; 29/283.5
See application file for complete search history.

(56) References Cited

U.S. PATENT DOCUMENTS

| | | | |
|---|---|---|---|
| 7,203,140 | B2 | 4/2007 | Haga |
| 7,337,310 | B2 | 2/2008 | Cheston et al. |
| 2003/0231418 | A1* | 12/2003 | Katsuda ................. 360/55 |
| 2004/0252628 | A1 | 12/2004 | Detzler |
| 2005/0262361 | A1 | 11/2005 | Thibadeau |
| 2006/0072244 | A1* | 4/2006 | Rapp ..................... 360/137 |
| 2007/0220277 | A1 | 9/2007 | Osaki |
| 2008/0046998 | A1 | 2/2008 | Cromer et al. |
| 2008/0219122 | A1 | 9/2008 | Detzler et al. |
| 2008/0250948 | A1 | 10/2008 | Aoki et al. |
| 2009/0140086 | A1 | 6/2009 | Thiel |

FOREIGN PATENT DOCUMENTS

| | | | |
|---|---|---|---|
| JP | 2004039059 A | * | 2/2004 |
| JP | 2004046917 A | * | 2/2004 |
| JP | 02004071057 A | | 3/2004 |
| JP | 02004158172 A | | 6/2004 |
| JP | 02005040666 A | | 2/2005 |
| JP | 02006260725 A | | 9/2006 |
| JP | 2007087456 A | * | 4/2007 |
| JP | 2007280569 A | | 10/2007 |
| JP | 02007323783 A | | 12/2007 |
| JP | 02008108343 A | | 5/2008 |

OTHER PUBLICATIONS

English language Abstract of JP 2007087456 (A)—Apr. 5, 2007.

(Continued)

*Primary Examiner*—William J Klimowicz
(74) *Attorney, Agent, or Firm*—Weitzman Law Offices, LLC; Kenneth S. Weitzman

(57) ABSTRACT

A system for impairing at least one pair of data platters stacked. An alignment device is pivotably mounted; upper and lower arms of the alignment device are spaced apart from and extend parallel to one another. The alignment device is movable between a stowed position in which the alignment device is spaced apart from the data platters to an impairment position in which the upper and lower arms of the alignment device overlay at least an edge of the data platters. The upper arm includes an opening for receiving an impairment tool, the opening being generally aligned with an impairment opening formed in the enclosure when the alignment device is in the impairment position. The impairment tool is inserted through the impairment opening formed in the enclosure and the opening in the upper arm for engaging a surface of the data platters to impair the data platters.

1 Claim, 20 Drawing Sheets

OTHER PUBLICATIONS

English language Abstract of JP 2007280569 (A)—Oct. 25, 2007.
"GSA Industrial Tape and Hard Drive Destroyer 380/500," ProSource Packaging, Inc., http://www.machine-solution.com/prodinfo.asp?number=GIND+380%2D500 (retrieved Jun. 3, 2008).
"Hard Drive Impairment Tool," http://www.priorartdatabase.com/IPCOM/000139464/ (retrieved Jun. 3, 2008).
English language Abstract of JP 02004071057 (A)—Mar. 4, 2004.
English language Abstract of JP 02004158172 (A)—Jun. 3, 2004.
English language Abstract of JP 02005040666 (A)—Feb. 17, 2005.
English language Abstract of JP 02006260725 (A)—Sep. 28, 2006.
English language Abstract of JP 02007323783 (A)—Dec. 13, 2007.
English language Abstract of JP 02008108343 (A)—May 8, 2008.

* cited by examiner

HARD DRIVE DATA PLATTER IMPAIRMENT TOOL

BACKGROUND

1. Field of the Invention

This application relates generally to end of life product management tools for computer hardware, and more particularly, to a hard drive impairment tool.

2. Background

Databases storing private consumer and business information are often physically stored as digitally encoded data on rotating platters having magnetic surfaces. These platters are usually enclosed in hard drives. Data platters in a hard drive are typically made using an aluminum or glass substrate having a thin coating of various metallic alloys covered in magnetic film. The magnetic regions on the platter's surface each represent a binary unit of data. One or more platters may be mounted on a spindle, where the platter(s) rotate while a hard drive head reads and writes the magnetically charged data on the platter's surface.

As computer hardware and software become more sophisticated, computer users upgrade to newer versions of hardware and often dispose of their old hardware. This application discloses a system and method to safely and securely impair and/or destroy data platters containing confidential information before disposing of the hard drive.

SUMMARY

In one aspect of this disclosure, a system is disclosed for impairing at least one pair of data platters stacked parallel to each other in a hard drive. The system comprises a hard drive enclosure in which the data platters are mounted. An alignment device is pivotably mounted within the hard drive enclosure, the alignment device including an upper arm and a lower arm. The upper and lower arms are spaced apart from and extend parallel to one another. The alignment device is movable between a stowed position in which the alignment device is spaced apart from the data platters to an impairment position in which the upper and lower arms of the alignment device overlay at least an edge of the data platters. The upper arm includes an opening for receiving an impairment tool, the opening being generally aligned with an impairment opening formed in the enclosure when the alignment device is in the impairment position. The impairment tool is inserted through the impairment opening formed in the enclosure and the opening in the upper arm for engaging a surface of the data platters to impair the data platters.

The foregoing has outlined generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

A more complete understanding of this application can be obtained when the following detailed description is considered in conjunction with the following drawings, in which.

DETAILED DESCRIPTION

Different embodiments of a data platter impairment tool are disclosed herein. While the embodiments of the present disclosure illustrate the use of the data platter impairment tool within an illustrative hard drive enclosure, it is understood that the disclosed embodiments may be utilized with any other type of enclosure suitable for mounting data platters. The disclosed embodiments of the present application may be used to safely and securely impair and/or destroy data platters containing confidential information, such as, for example, social security numbers, financial data, trade secrets, etc. The disclosed embodiments also permit disposal of data platters on-site instead of transporting data platters to an off-site facility where there is an increased risk of misplacement and/or theft.

Figure 1:
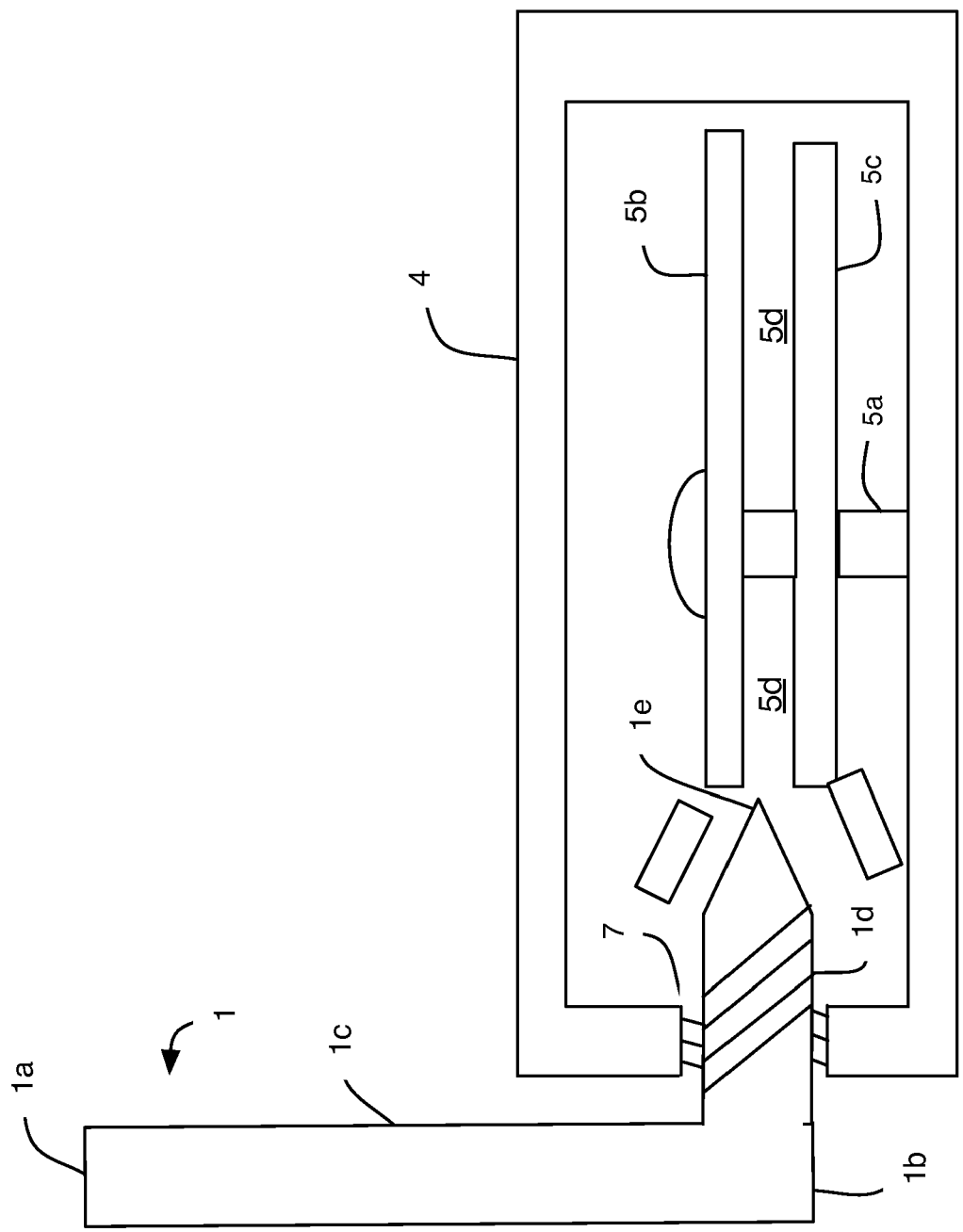
FIG. 1 is a side elevation view of a data platter impairment tool in an illustrative hard drive.

FIG. 1 illustrates a preferred embodiment of a data platter impairment tool 1 used to impair or otherwise render inoperable data platters 5b, 5c within an illustrative hard drive 4. Referring to FIG. 1, impairment tool 1 preferably includes an elongated body 1c having a distal end 1a and a proximal end 1b. The proximal end 1b preferably includes a threaded impairment head 1d. In the embodiment shown in FIG. 1, the threaded impairment head 1d projects from the proximal end 1b of the impairment tool 1 at an angle of approximately 90°. The threaded impairment head 1d preferably includes a tapered impairment tip 1e.

FIG. 1 also illustrates an illustrative hard drive 4 having a pair of data platters 5b, 5c rotatably mounted on a spindle 5a within a hard drive enclosure. As would be appreciated by one skilled in the art, data platters, such as, for example, data platters 5b, 5c, are generally stacked in parallel form. While the drawings illustrate hard drives with only two data platters, namely 5b and 5c, it is understood that any number of data platters may be stacked parallel to each other and that only one pair of data platters are shown for illustrative purposes. The embodiments disclosed herein are not limited to use with only one pair of data platters and may be used with any number of data platters.

A threaded access point 7 is preferably located on hard drive 4 to provide an access opening aligned with the gap 5d between adjacent data platters 5b, 5c. Threaded access point 7 formed in the hard drive enclosure may include a conventional protective cover or seal (not shown), such as, for example, an adhesive seal, a rubber plate or a rubber grommet, to prevent dust or other harmful material from entering hard drive 4 while the hard drive is in use. When disposal of hard drive 4 is desired, the cover or seal may be removed to permit impairment of the data platters 5b, 5c.

Threaded access point 7 is preferably adapted to allow impairment head 1d of impairment tool 1 to thread into hard drive 4 by rotating body 1c, thereby moving the tapered impairment tip 1e into the gap 5d between the adjacent data platters 5b, 5c. As impairment head 1d is threaded further into hard drive 4, the tapered impairment tip 1e also moves deeper into gap 5d and engages the adjacent surfaces of data platters 5b, 5c, resulting in the displacement and eventual impairment of data platters 5b, 5c as shown in FIG. 1. Impairment tool 1 may be made from steel, plastic or any other suitable material having sufficient strength to impair data platters.

FIGS. 2-5 illustrate another embodiment of an impairment tool 11 for use in an illustrative hard drive 4. The impairment tool 11 preferably includes an elongated body 11c having a distal end 11a and a proximal end 11b. The proximal end 11b preferably includes a finger 11d that projects from the proximal end 11b. The finger 11d may project from the proximal end 11b at any suitable angle, such as, for example, approximately 45°. The finger 11d preferable terminates in an impairment head 11e.

Figure 2:
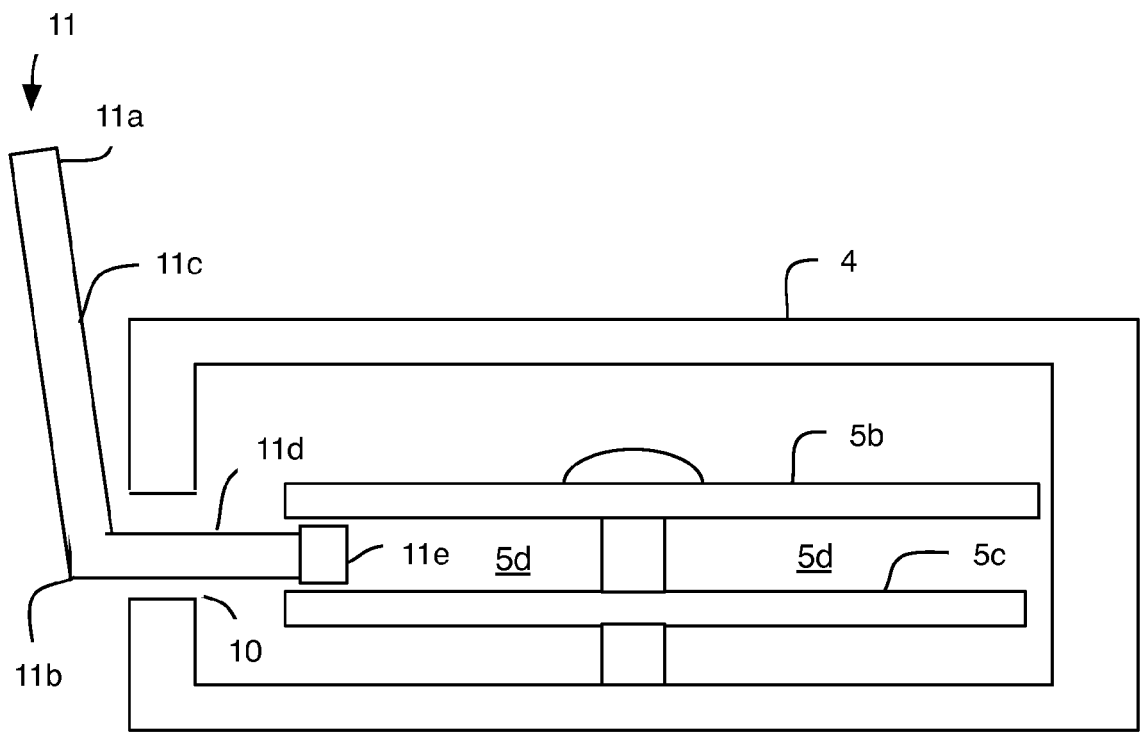
FIG. 2 is a side elevation view of another embodiment of a data platter impairment tool in an illustrative hard drive.
Figure 3:
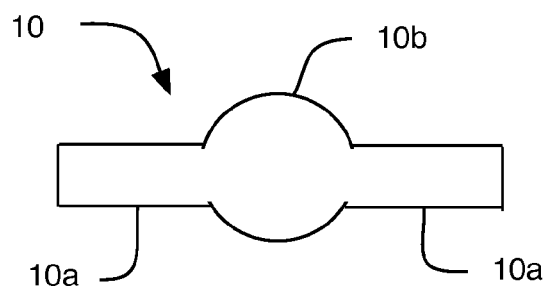
FIG. 3 is a front view of an impairment tool access opening formed in the illustrative hard drive of FIG. 2.
Figure 4:
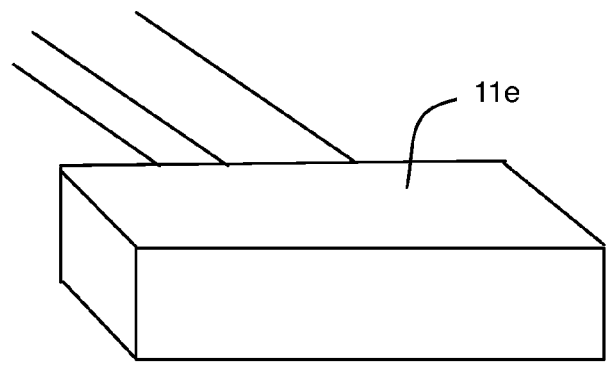
FIG. 4 is a perspective view of the impairment tool of FIG. 2.

Impairment head 11e is preferably a generally rectangular structure as illustrated in FIG. 4. Impairment head 11e is preferably adapted for insertion into hard drive 4 through the access point 10 formed in the hard drive enclosure, which is illustrated in FIG. 3. In contrast to access point 7 of FIG. 1, access point 10 need not be threaded. Instead, referring to FIG. 3, access point 10 preferably includes a substantially circular midsection 10b having two rectangular sections 10a extending from opposing sides of the circular midsection. Circular midsection 10b and outwardly extending rectangular sections 10a are sized to accommodate impairment head 11e of FIG. 4. Similar to access point 7, access point 10 is also preferably located on illustrative hard drive 4 in general alignment with the gap 5d between adjacent stacked data platters 5b, 5c as shown in FIG. 2. A protective seal or cover, such as, for example, an adhesive seal, a rubber plate, or a rubber grommet, may also cover access point 10 when hard drive 4 is in use.

Figure 5:
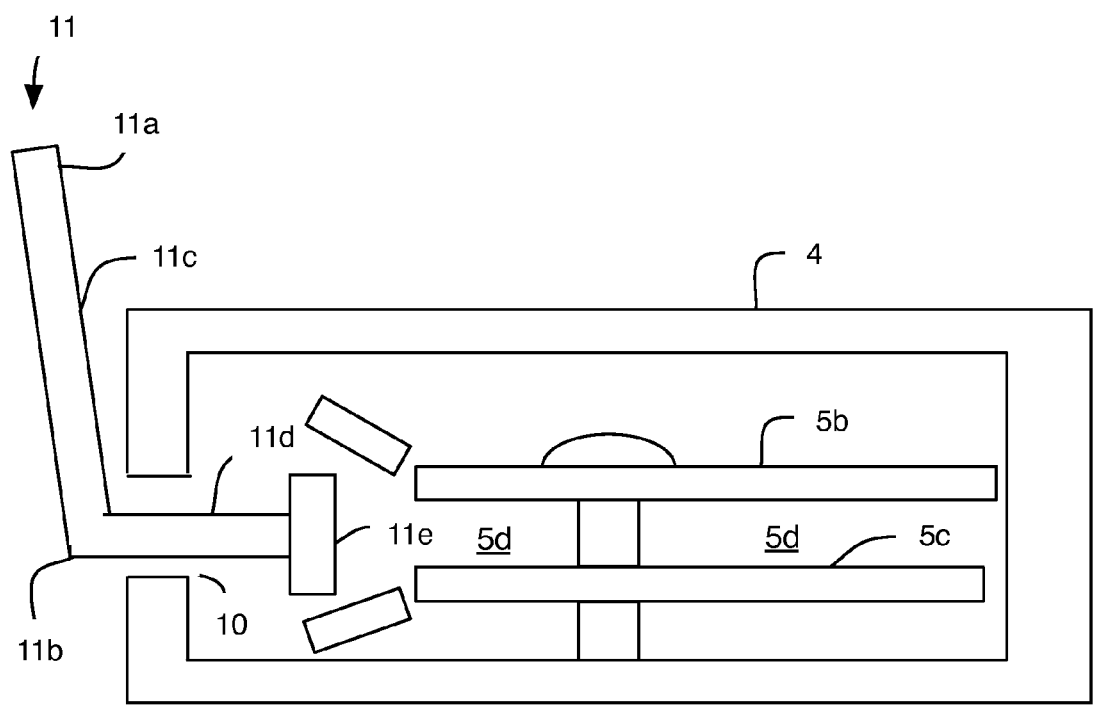
FIG. 5 is a side elevation view of the hard drive of FIG. 2 after the impairment tool has impaired the data platters of the hard drive.

Referring to FIG. 5, impairment of data platters 5b, 5c is preferably accomplished by inserting impairment head 11e of impairment tool 11 through the access point 10 and into the gap 5d between data platters 5b, 5c as shown in FIG. 2. Once impairment head 11e is inserted into the gap 5d, impairment head 11e may be rotated either clockwise or counterclockwise, thereby deforming and ultimately impairing data platters 5b, 5c as shown in FIG. 5. Impairment tool 11 may be made of steel, plastic or any other material suitable for impairing data platters.

Figure 6:
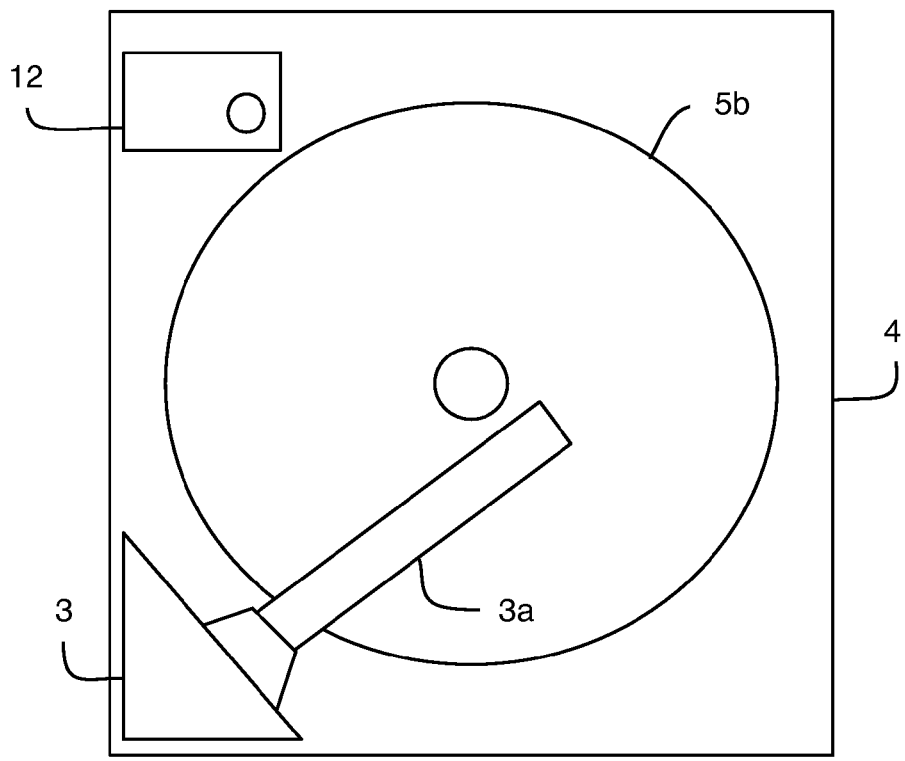
FIG. 6 is a top view of an illustrative hard drive with an alignment clamp in a stowed position.
Figure 7:
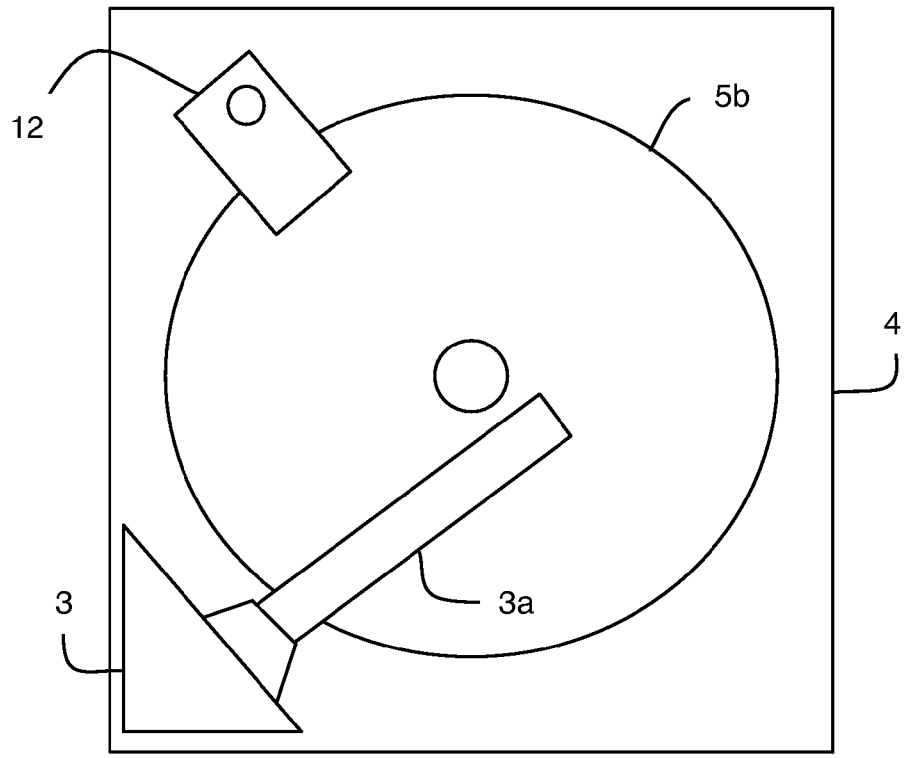
FIG. 7 is a top view of the illustrative hard drive of FIG. 6 with the alignment clamp in an impairment position.

FIGS. 6-10 illustrate another embodiment of an impairment tool 1 that cooperates with a movable alignment device 12 to impair data platters 5b, 5c of an illustrative hard drive 4. As shown in FIGS. 6 and 7, the illustrative hard drive 4 includes data platters 5b, 5c, a read-write head 3a, and a read-write base 3 mounted within a hard drive enclosure.

FIG. 6 illustrates the alignment device 12 in a stowed position, and FIG. 7 illustrates the alignment device 12 pivoted to an impairment position. Alignment device 12 is preferably pivotally mounted within the hard drive 4 in proximity to data platters 5b, 5c so that the alignment device 12 may be moved from the stowed position (FIG. 6) to the impairment position (FIG. 7) as described below.

Figure 8:
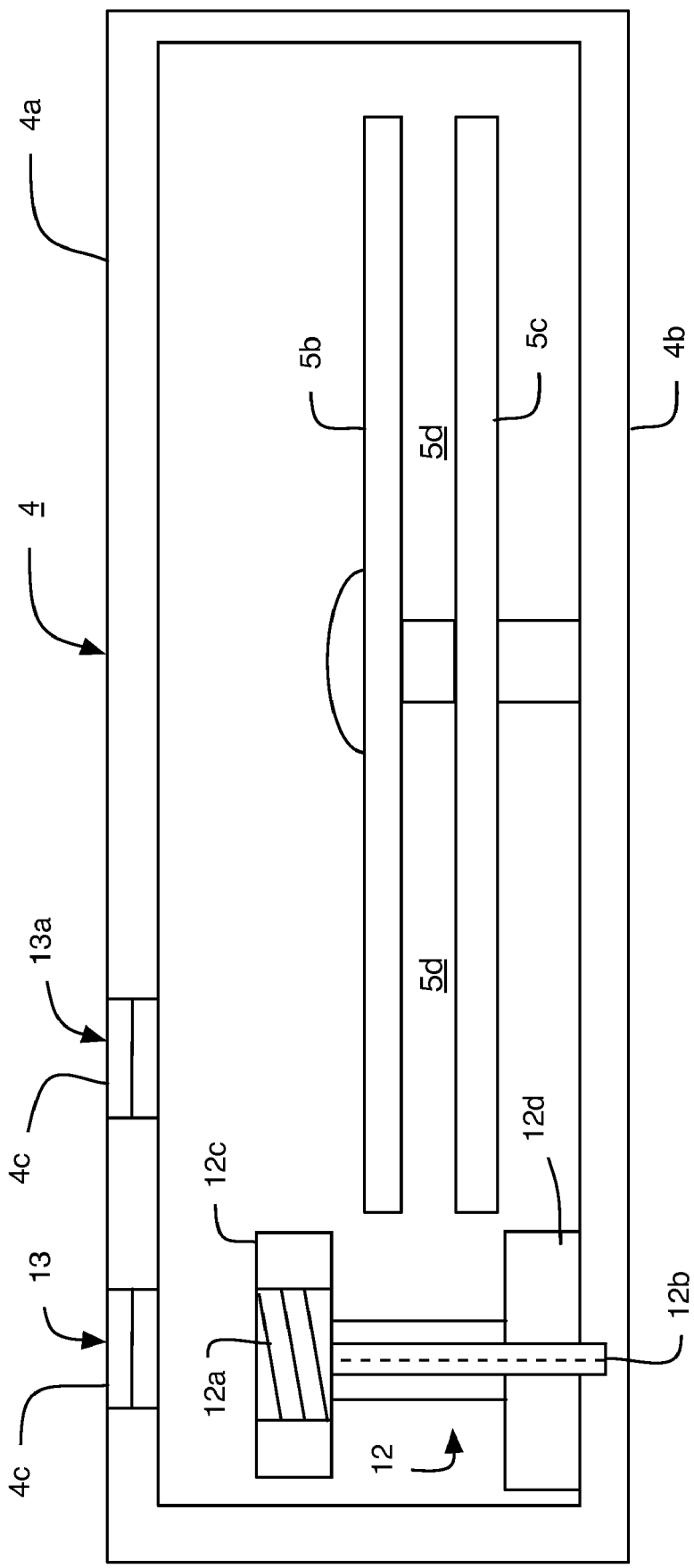
FIG. 8 is a side elevation view of the alignment clamp within the hard drive of FIG. 6.
Figure 9:
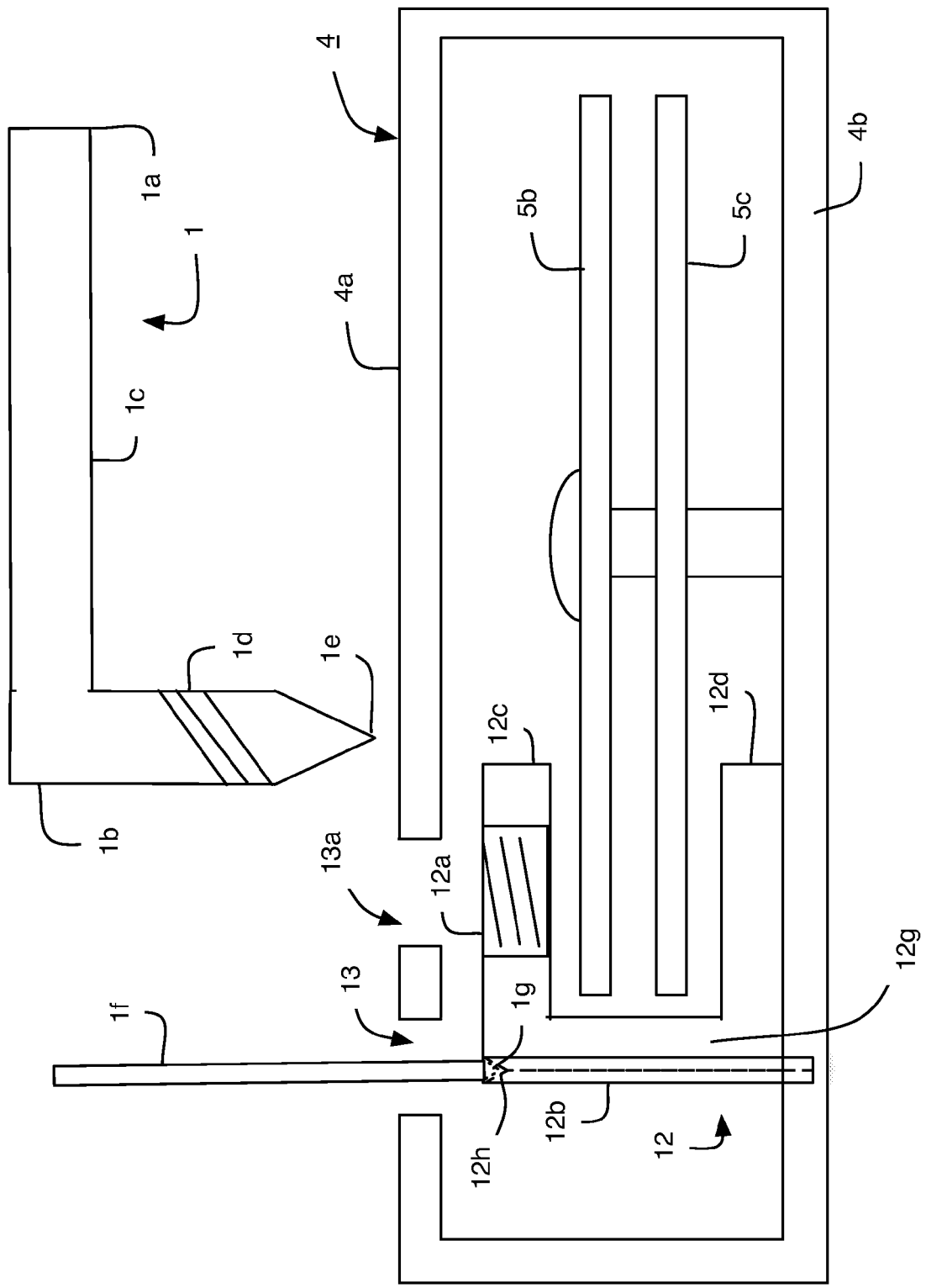
FIG. 9 is a side elevation view of the hard drive of FIG. 6 with the alignment clamp in impairment position and a preferred impairment tool.
Figure 10:
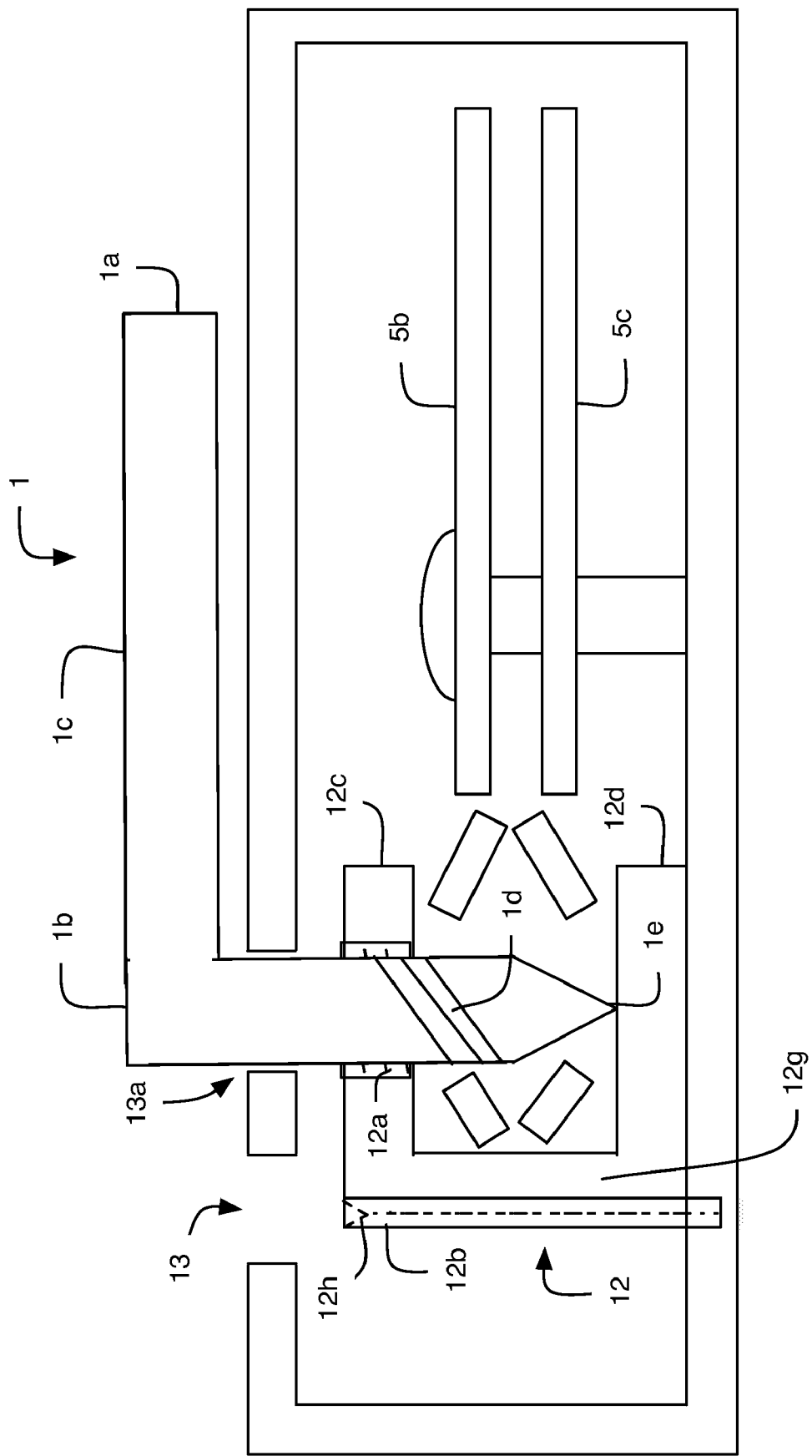
FIG. 10 is a side elevation view of the hard drive of FIG. 6 showing the preferred impairment tool impairing the data platters of the hard drive.

FIGS. 8-10 are side elevation views of the hard drive 4 illustrating the preferred usage of alignment device 12 for impairing data platters 5b, 5c within the hard drive enclosure. FIG. 8 illustrates the alignment device 12 in the stowed position, and FIGS. 9 and 10 illustrate the alignment device 12 after it has been pivoted to the impairment position. Alignment device 12 preferably includes an upright body 12g from which an upper arm 12c and a lower arm 12d extend as shown in FIGS. 9-10. Lower arm 12d and upper arm 12c are spaced apart from one another and preferably extend in a direction perpendicular to the upright body 12g. Alignment device 12 is preferably pivotally connected to the enclosure base 4b of hard drive 4 via pivot pin 12b. Pivot pin 12b is preferably press fit into the upright clamp bar 12g and extends vertically through the clamp bar 12g into the enclosure base 4b of the hard drive 4.

The top 4a of the enclosure of hard drive 4 preferably includes an alignment access opening 13 and an impairment access opening 13a. Alignment access opening 13 is preferably located in the top 4a of the enclosure of hard drive 4 in a position that is generally aligned with and provides access to the top of pivot pin 12b. Similarly, impairment access opening 13a is preferably located in the top 4a of the enclosure of hard drive 4 in a position that is generally aligned with and provides access to the top of threaded opening 12a when the alignment device 12 is pivoted to the impairment position.

The alignment access opening 13 and impairment access opening 13a are preferably sealed with removable seals 4c while hard drive 4 is in use as shown in FIG. 8. The seal 4c may be removed when impairment of data platters 5b, 5c is desired as shown in FIGS. 9 and 10. The seal 4c may be, for example, an adhesive seal, a rubber plate, a rubber grommet, or any other conventional seal suitable for use with hard drive 4.

Referring again to FIG. 9, the alignment device 12 may be moved from the stowed position to the impairment position by preferably removing the optional seal or cap 4c from alignment access opening 13 and inserting an end of pivot tool 1c through the alignment access opening 13 and into the top or free end of pivot pin 12b (or the exposed surface of upper arm 12c, which is adapted to accommodate entry of a pivot tool 1f to rotate the alignment device 12 from the stowed position to the impairment position, and vice versa. Pivot tool 1f may be any tool suitable for insertion into pivot pin 12b (or the exposed surface of upper arm 12c). For instance, the free end of the pivot pin 12b (or the exposed surface of upper arm 12c) may be formed with an indentation or other geometric feature 12h (e.g., slot, star, octagon, etc.). An end of the pivot tool 1f may include a corresponding feature 1g that engages (e.g., male-to-female engagement) the indentation or other feature 12h on the free end of the pivot pin 12b (or the exposed surface of upper arm 12c) to permit rotation of the alignment device 12 when the pivot tool 1f is turned. Once the end of the pivot tool 1f is inserted into the free end of the pivot pin 12b (or the exposed surface of upper arm 12c), the pivot tool 1c may be rotated (clockwise or counterclockwise) to pivot alignment device 12 from the stowed position to the impairment position. Pivoting alignment device 12 ensures that upper arm 12c and lower arm 12d substantially enclose or overlay at least the edges of data platters 5b, 5c as shown in FIG. 9.

Moving alignment device 12 into the impairment position preferably aligns impairment access opening 13a with threaded opening 12a to facilitate access to threaded opening 12a by impairment tool 1. Impairment tool 1 is similar to that described above with respect to FIG. 1 and preferably includes a threaded impairment head 1d that terminates in a tapered impairment tip 1e. Threaded opening 12a is preferably adapted to allow impairment head 1d to thread through upper arm 12c, thereby allowing impairment tip 1e to engage, deform and eventually impair data platters 5b, 5c as shown in FIG. 10. Impairment tool 1 may be made from steel, plastic or any other suitable material having sufficient strength to impair data platters.

Figure 11:
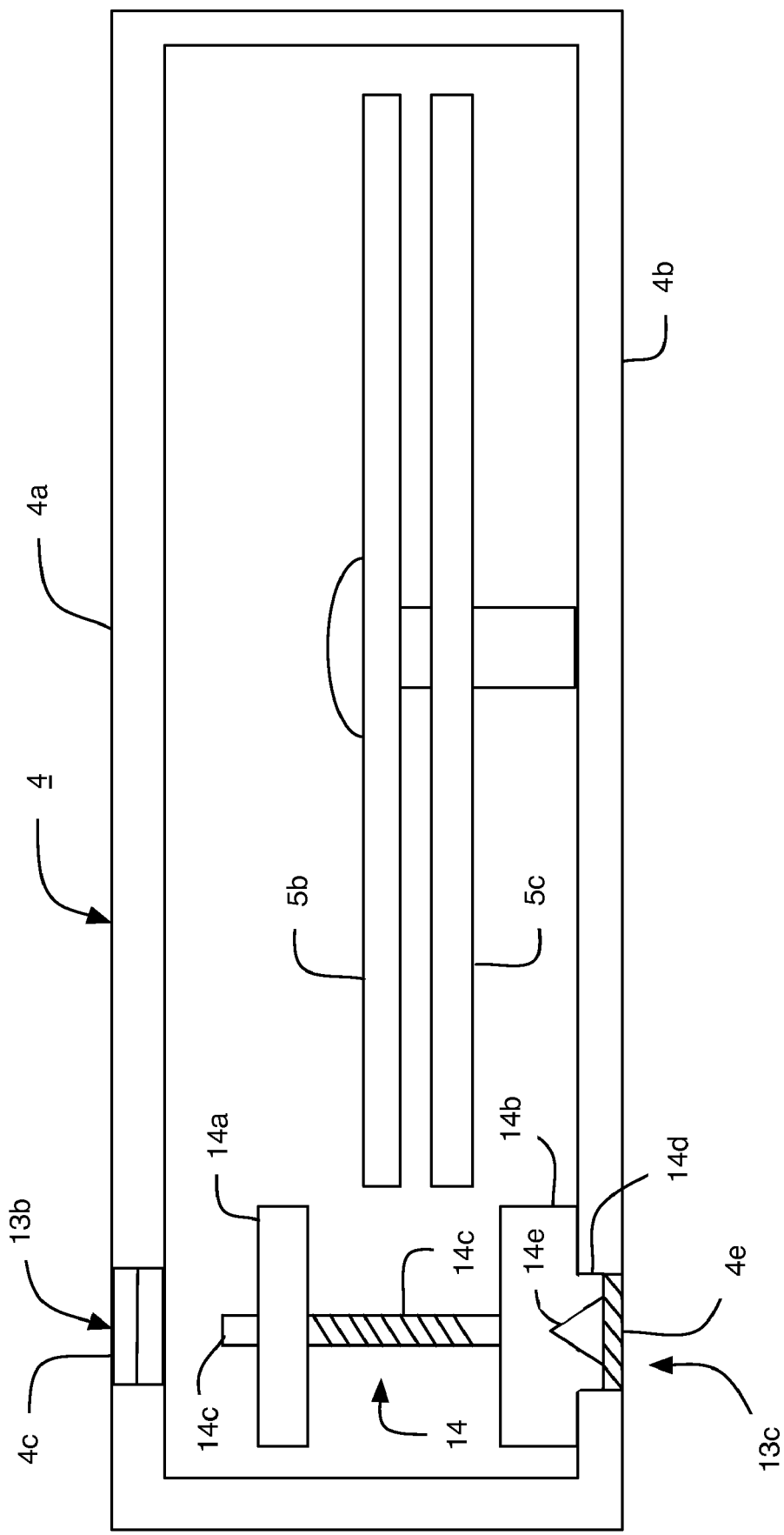
FIG. 11 is a side elevation view of an illustrative hard drive with another embodiment of an impairment clamp in a stowed position.
Figure 12:
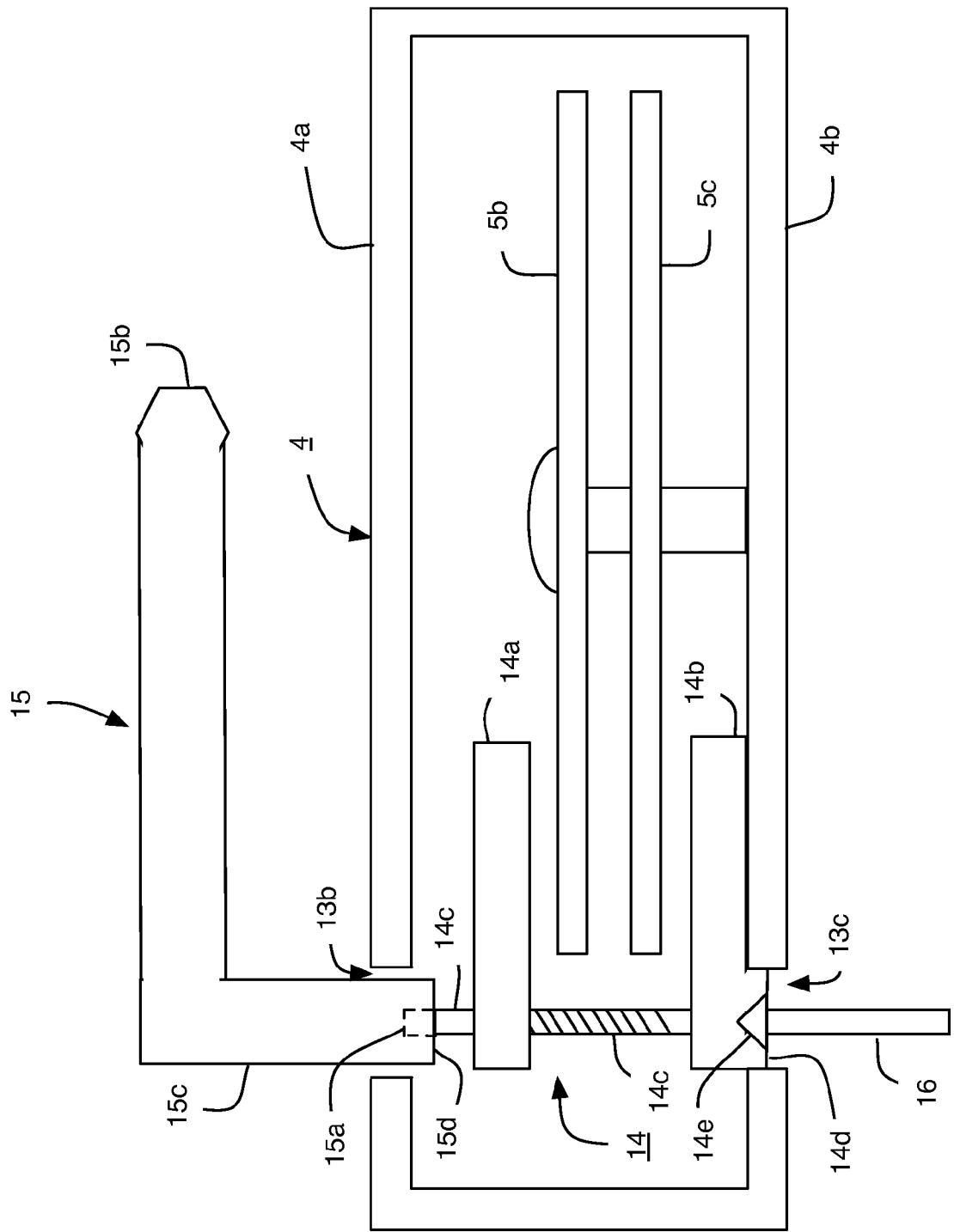
FIG. 12 is a side elevation view of the hard drive of FIG. 11 with the impairment clamp in an impairment position.
Figure 13:
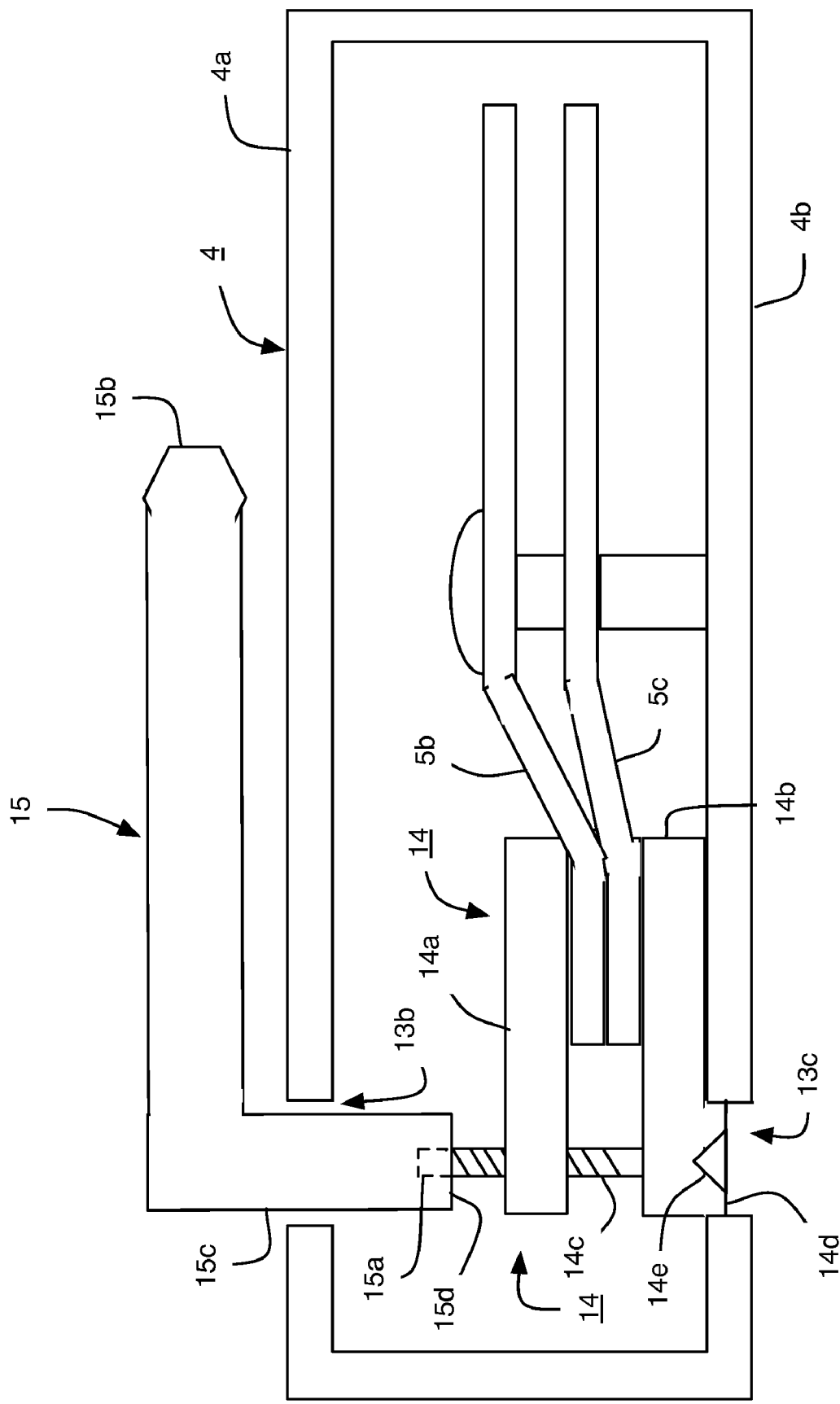
FIG. 13 is a side elevation view of the hard drive of FIG. 11 showing the impairment clamp impairing data platters of the hard drive.

FIGS. 11-13 illustrate another embodiment of a data platter impairment tool 15 that cooperates with a movable impairment clamp 14 to impair data platters 5b, 5c of an illustrative hard drive 4. FIG. 11 illustrates the impairment clamp 14 in the stowed position within hard drive 4, and FIGS. 12 and 13 illustrate the impairment clamp 14 in the impairment position.

Referring to FIG. 12, impairment clamp 14 preferably includes a movable arm or jaw member 14a and a fixed arm or jaw member 14b. The movable arm 14a is operatively connected to the fixed arm 14b via a threaded rotation spindle 14c. The movable arm 14a includes a threaded opening therethrough. The threaded rotation spindle 14c passes through the threaded opening in the movable arm 14a so that the threads on the spindle engage corresponding threads within the opening of the movable arm. One end of the spindle 14c is supported within an opening in the fixed arm 14b so that the spindle may freely rotate relative the fixed arm.

The fixed arm 14b preferably includes a boss, flange or other protrusion 14d extending from its lower surface. The boss 14b is located or otherwise seated within an opening 13c formed in the base 4b of the enclosure of the hard drive 4 so that the fixed arm 14b may pivot relative the base 4b.

The lower exposed surface of the boss 14d is preferably formed with an indentation or other geometric feature 14e (e.g., slot, star, octagon, etc.) to facilitate rotation of the clamp 14 from the stowed position to the impairment position, and vice versa. As shown in FIG. 12, this may be accomplished by removing the optional seal or cap 4e from opening 13c and inserting an end of pivot tool 16 through the alignment access opening 13c and into the geometric feature 14e. The end of the pivot tool 16 preferably includes a corresponding feature that engages (e.g., male-to-female engagement) the indentation or other feature 14e on the boss 14d to permit rotation of the impairment clamp 14 when the pivot tool 16 is turned. Once the end of the pivot tool 16 is inserted into the feature 14e, the pivot tool 16 may be rotated (clockwise or counterclockwise) to pivot impairment clamp 14 from the stowed position to the impairment position. Pivoting impairment clamp 14 into the impairment position ensures that movable arm 14a and fixed arm 14b substantially enclose or otherwise overlay at least the edges of data platters 5b, 5c as shown in FIG. 12.

The top 4a of the enclosure of the hard drive 4 preferably includes an impairment access opening 13b. Impairment access opening 13b is preferably located in the top 4a of hard drive 4 in a position that is generally aligned with and provides access to the top of threaded spindle 14c when the impairment clamp 14 is pivoted to the impairment position.

The alignment access opening 13c and impairment access opening 13b are preferably sealed with removable seals 4c, 4e while hard drive 4 is in use as shown in FIG. 11. The seal 4c, 4e may be removed when impairment of data platters 5b, 5c is desired as shown in FIGS. 12 and 13. The seal 4c, 4e may be, for example, an adhesive seal, a rubber plate, a rubber grommet, or any other conventional seal suitable for use with hard drive 4.

Referring to FIG. 12, impairment clamp 14 may be moved from the stowed position to the impairment position in the manner described above so that the movable arm 14a and fixed arm 14b substantially enclose or otherwise overlay at least the ends of data platters 5b, 5c. Moving impairment clamp 14 into the impairment position preferably aligns impairment access opening 13b with the top of threaded spindle 14c to facilitate access to the threaded spindle by impairment tool 15.

The impairment tool 15 preferably includes a distal member 15b that functions as a handle and a proximal member 15c that terminates in a proximal end 15d. In the embodiment illustrated in FIG. 12, the proximal member 15c extends at an angle of approximately 90° from the distal member 15b. Proximal end 15d preferably includes an opening or other geometric feature 15a that is adapted to releasably engage the top of threaded spindle 14c so that rotation of impairment tool 15 causes the threaded spindle 14c to rotate as well. For example, the top of the spindle 14c may include a rectangular head (not shown) and the opening 15a within the proximal end 15d of the impairment tool 15 may be similarly shaped and dimensioned to receive the head of the spindle.

Referring to FIGS. 12 and 13, the proximal member 15c of the impairment tool 15b is inserted through the access opening 13b in the top 4a of the hard drive enclosure so that the top of the threaded spindle 14c engages with the corresponding opening 15a in the distal end 15d of the impairment tool. Rotation of the impairment tool 15 in a first direction (e.g., clockwise direction) causes the threaded spindle 14c to rotate relative the fixed arm 14b, which, in turn, causes the movable arm 14a to move in a direction toward the fixed arm due to the corresponding threads on the spindle and movable arm.

As the movable arm 14a moves toward the fixed arm 14b, the movable arm engages at least the edge of the data platter 5b and begins to deform it. Further movement of the movable arm 14a toward the fixed arm 14b results in deformation of and eventual impairment of the data platters 5b, 5c, with the data platters clamped between the movable arm and fixed arm as shown in FIG. 13. Rotation of the impairment tool in the opposite direction (e.g., counterclockwise direction) causes the movable arm 14a to move in a direction away from the fixed arm 14b.

Figure 14:
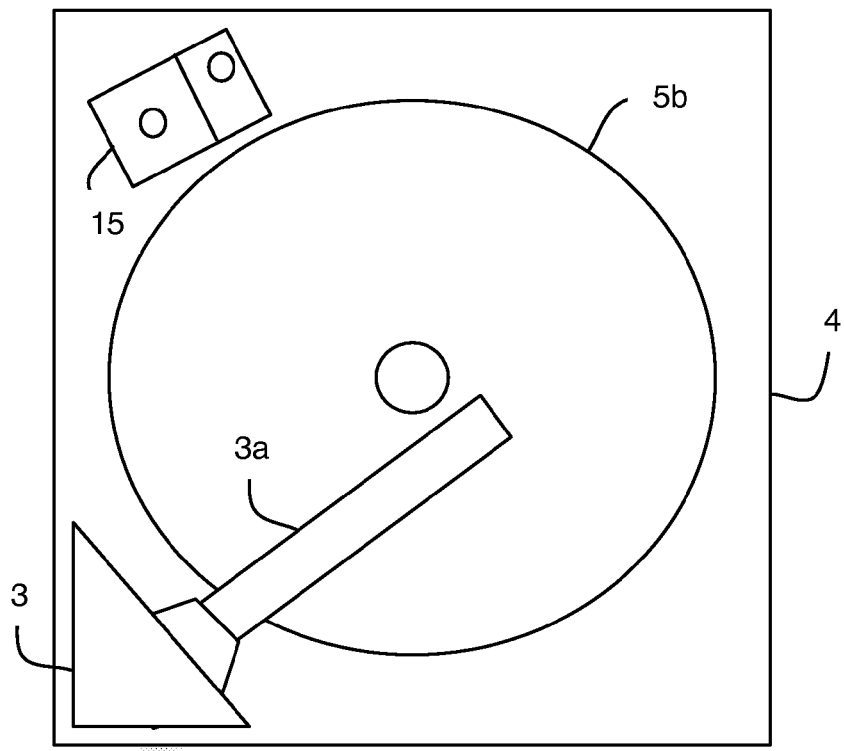
FIG. 14 is a top view of an illustrative hard drive with another embodiment of an alignment clamp in a stowed position.
Figure 15:
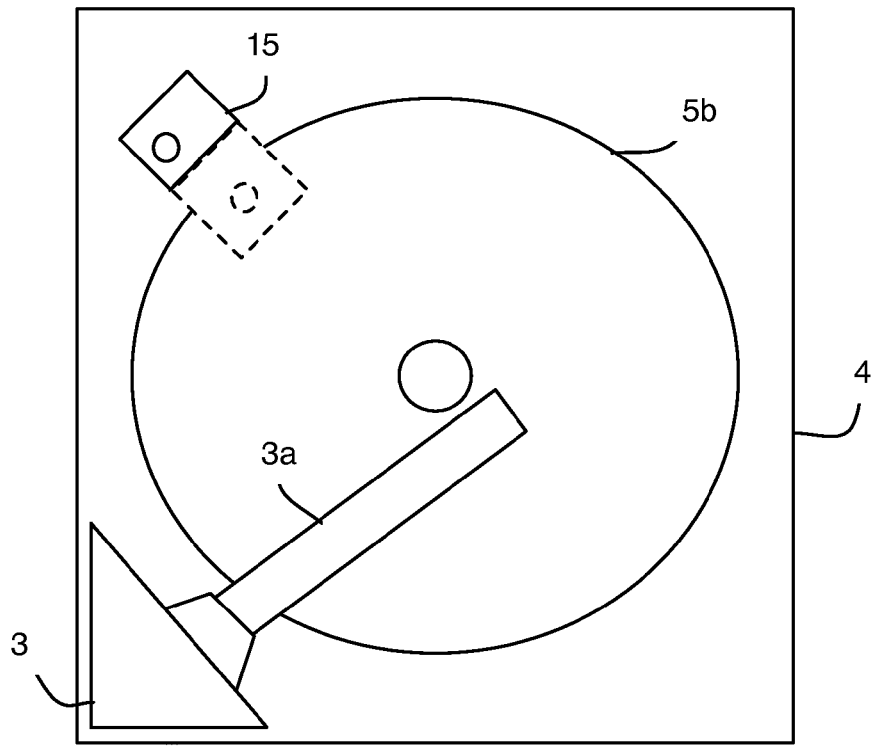
FIG. 15 is a top view of the illustrative hard drive of FIG. 14 with the alignment clamp in an impairment position.

FIGS. 14-19 illustrate another embodiment of a data platter impairment device 15 to impair data platters 5b, 5c of an illustrative hard drive 4. As shown in FIGS. 14 and 15, the illustrative hard drive 4 includes data platters 5b, 5c, a read-write head 3a, and a read-write base 3 mounted within an enclosure of the hard drive.

FIG. 14 illustrates the impairment device 15 in the stowed position, and FIG. 15 illustrates the impairment device 15 pivoted to the impairment position. Impairment device 15 is preferably pivotally mounted within the hard drive 4 in proximity to data platters 5b, 5c so that the impairment device 15 may be moved from the stowed position (FIG. 14) to the impairment position (FIG. 15) as described below.

Figure 16:
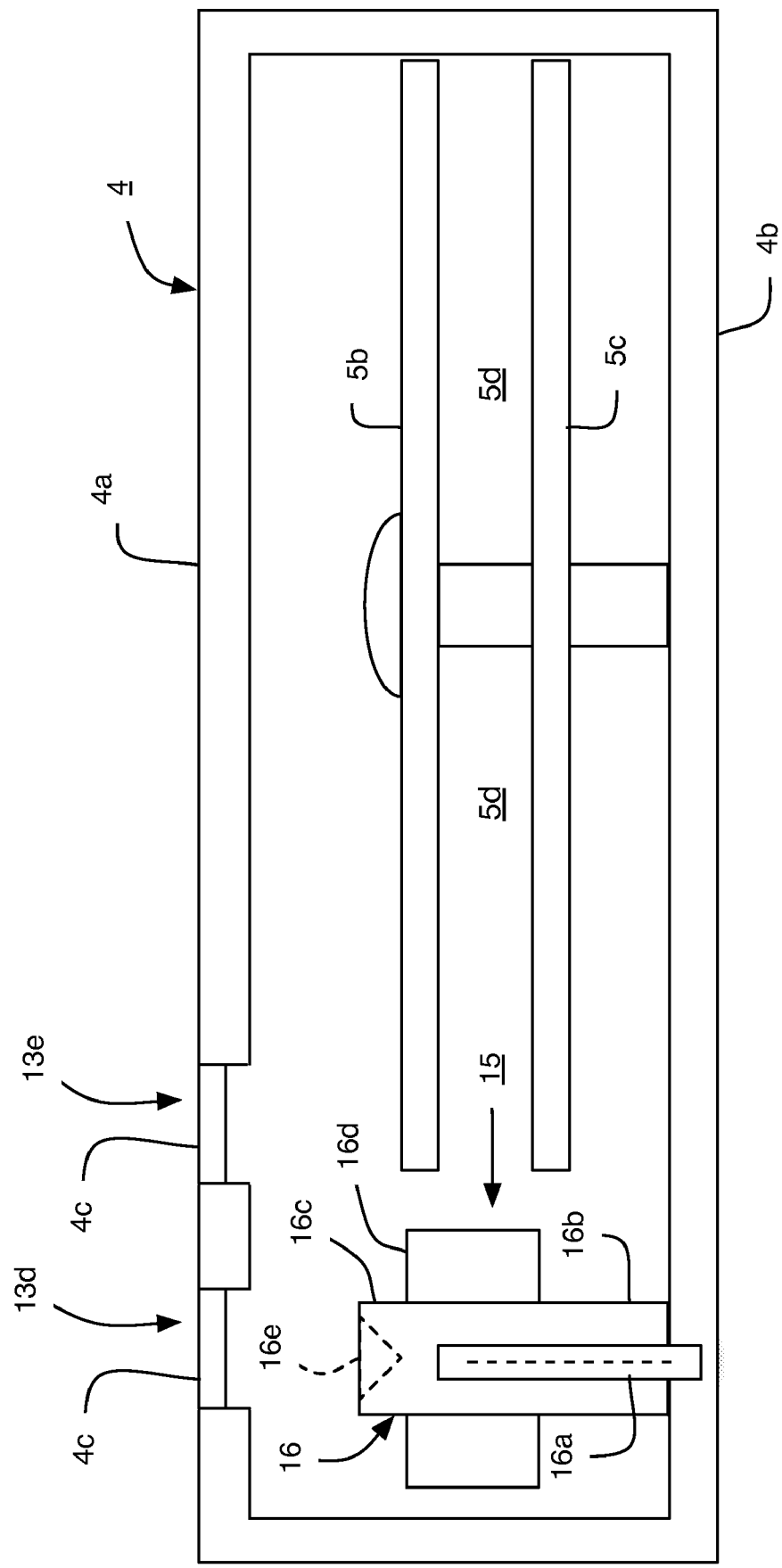
FIG. 16 is a side elevation view of the hard drive of FIG. 14 with the impairment tool in a stowed position.

FIG. 16 illustrates the illustrative hard drive 4 with the impairment device 15 shown in the stowed position. Impairment device 15 preferably includes a deployment body 16 having a proximal portion 16b and a distal portion 16c. The proximal portion 16b of deployment body 16 is preferably pivotally mounted to the base 4b of the enclosure of the hard drive 4 via a pivot pin 16a.

The top or cover 4a of the enclosure of hard drive 4 preferably includes alignment access opening 13d and impairment access opening 13e. Alignment access opening 13d is preferably located in the enclosure top or cover 4a of hard drive 4 in a position that is generally aligned with and provides access to an indentation or other geometric feature 16e (e.g., slot, star, octagon, etc.) formed in the top of distal portion 16c. Similarly, impairment access opening 13e is preferably located in the top or cover 4a of hard drive 4 in a position that is generally aligned with and provides access to the top of opening 17a when the deployment body 16 is pivoted to the impairment position, as shown in FIG. 17.

The alignment access opening 13d and impairment access opening 13e are preferably sealed with removable seals 4c while hard drive 4 is in use as shown in FIG. 16. The seal 4c may be removed when impairment of data platters 5b, 5c is desired as shown in FIG. 17. The seal 4c may be, for example, an adhesive seal, a rubber plate, a rubber grommet, or any other conventional seal suitable for use with hard drive 4.

Figure 17:
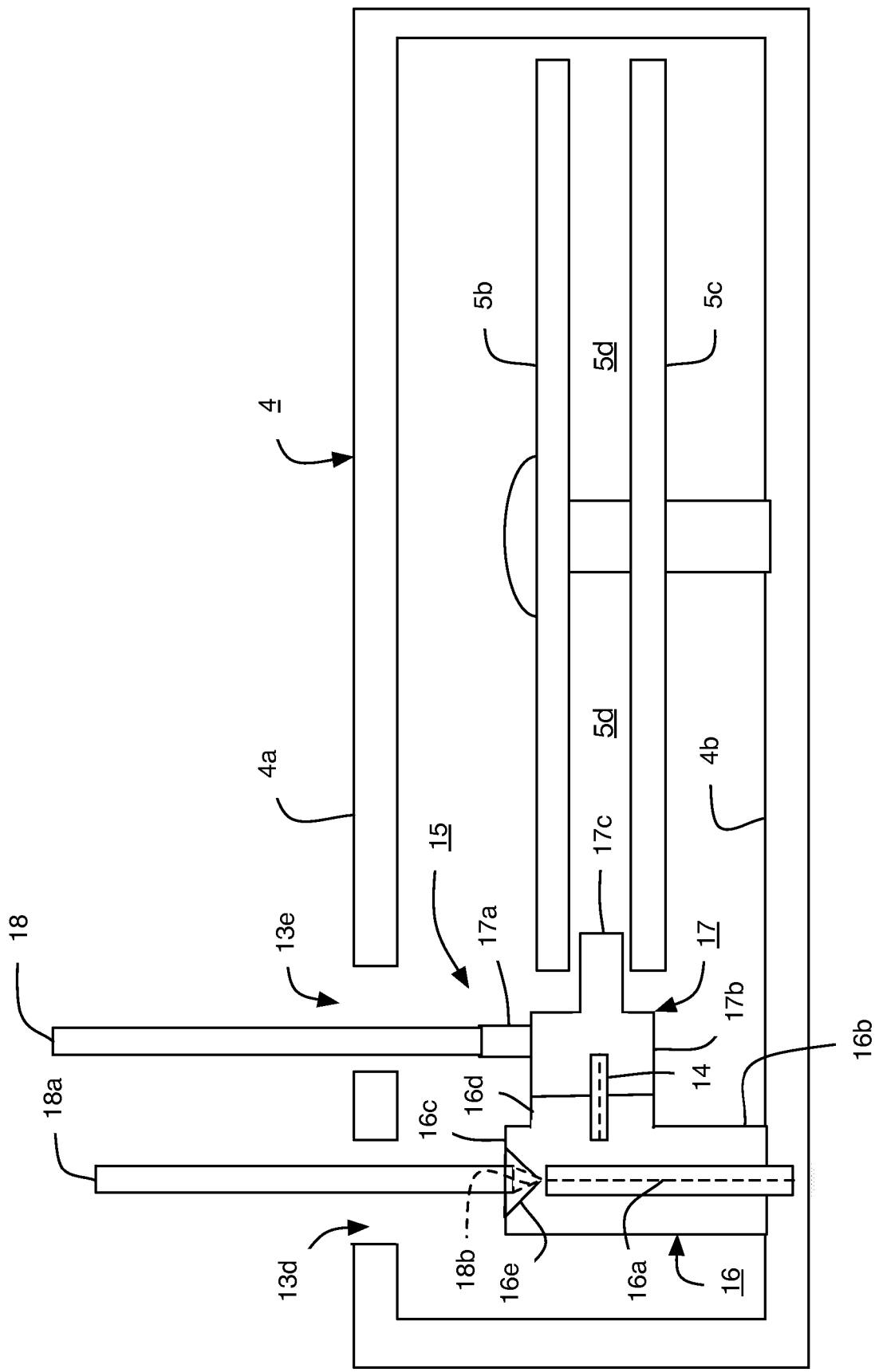
FIG. 17 is a side elevation of the hard drive of FIG. 14 with the impairment tool in an impairment position.

FIG. 17 is a side elevation view of the illustrative hard drive 4 showing the impairment device 15 in the impairment position. As discussed above, access point 13d is preferably located in the top or cover 4a of the enclosure of the hard drive 4 so that it is generally aligned with and provides access to the indentation or geometric feature 16e formed in the top of the distal member 16c of deployment body 16. Alternatively, the free end of the pivot pin 16a may extend to the top of the distal member 16c and the indentation or other geometric feature 16e may be formed in the free end of the pivot pin 16a.

The impairment device 15 may be moved from the stowed position to the impairment position by preferably removing the optional seal or cap 4c from alignment access opening 13d and inserting an end of pivot tool 18a through the alignment access opening 13d and into indentation or other geometric feature 16e (e.g., slot, star, octagon, etc.) formed in the exposed surface of distal member 16c of deployment body 16. Pivot tool 18a may be any tool suitable for insertion into the indentation or other geometric feature 16e. An end of the pivot tool 18a preferably includes a corresponding feature 18b that engages (e.g., male-to-female engagement) the indentation or other feature 16e formed in the exposed surface of distal member 16c to permit rotation of the impairment device 15 when the pivot tool 18a is turned. Once the end of the pivot tool 18b is inserted into the feature 16e, the pivot tool 18a may be rotated (clockwise or counterclockwise) to pivot impairment device 15 from the stowed position to the impairment position, and vice versa.

FIG. 17 also illustrates a side view of the impairment device 15, which preferably includes an impairment tool 17 pivotably connected to deployment member 16d of deployment body 16 via a pivot pin 14. The impairment tool 17 preferably includes a main body 17b and a projecting member 17c extending from the main body. The projecting member 17c is dimensioned to fit between the gap 5d between the stack data platters 5b, 5c when the impairment device 15 is in the impairment position.

Access point 13e is preferably located in the top or cover 4a of the enclosure of hard drive 4 so that the access point generally aligns with and provides access to an opening 17a formed in the impairment tool 17 when the impairment device 15 is in the impairment position. Removing the seal 4c covering access point 13e facilitates access to impairment opening 17a by impairment lever 18. Impairment opening 17a is preferably adapted to accommodate an end of impairment lever 18, which is preferably inserted through access point 13e and into opening 17a.

Figure 18:
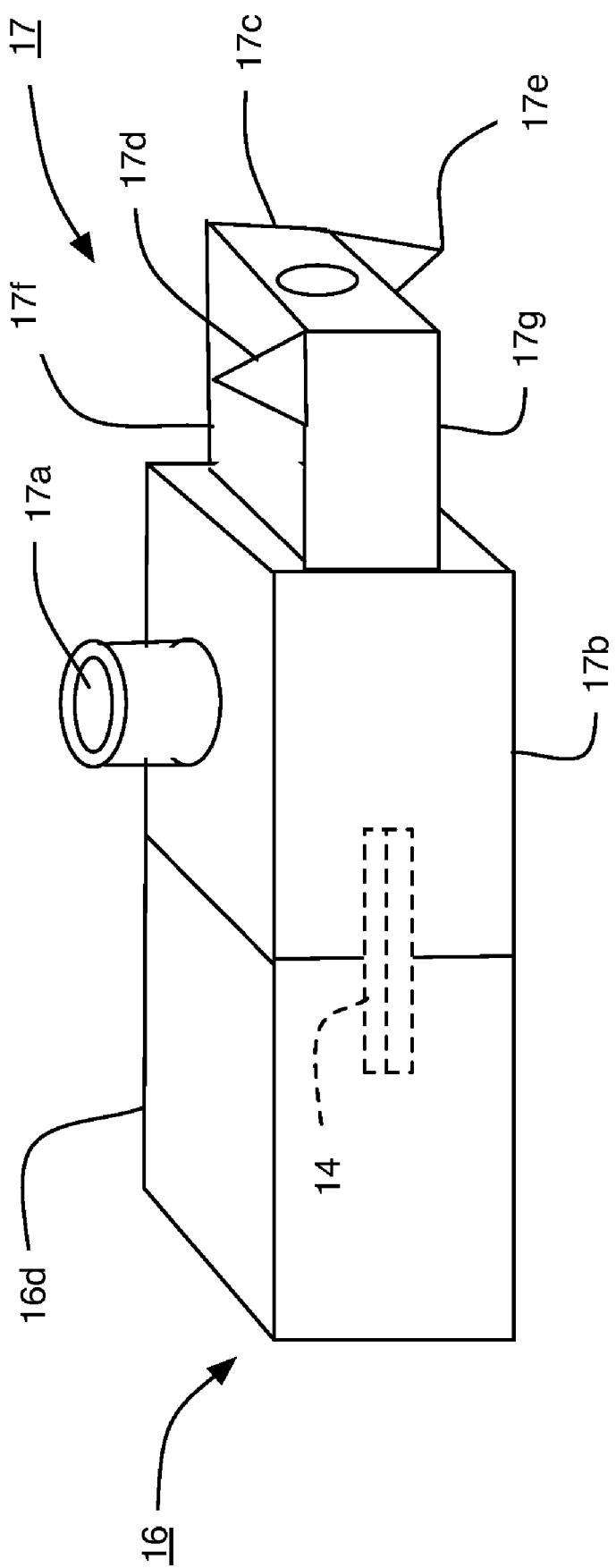
FIG. 18 is a perspective view of a deployment body and impairment device.

FIG. 18 illustrates the impairment tool 17 pivotably connected to deployment member 16d of deployment body 16 via pivot pin 14. The impairment tool 17 preferably includes a main body 17b and a projecting member 17c extending longitudinally from the main body 17b. The opening 17a is shown in the upper surface of the main body 17b for receiving an end of impairment lever 18. The impairment tool 17 is preferably adapted to rotate or pivot relative the deployment member 16d in response to force applied to the impairment lever 18 when inserted within opening 17a.

Two or more impairment tips 17d, 17e are shown projecting outwardly from opposing surfaces 17f, 17g of the projecting member 17c. One impairment tip 17d preferably extends upwardly from the proximal edge of surface 17f and the opposing impairment tip 17e preferably extends downwardly from the distal edge of surface 17g.

Figure 19:
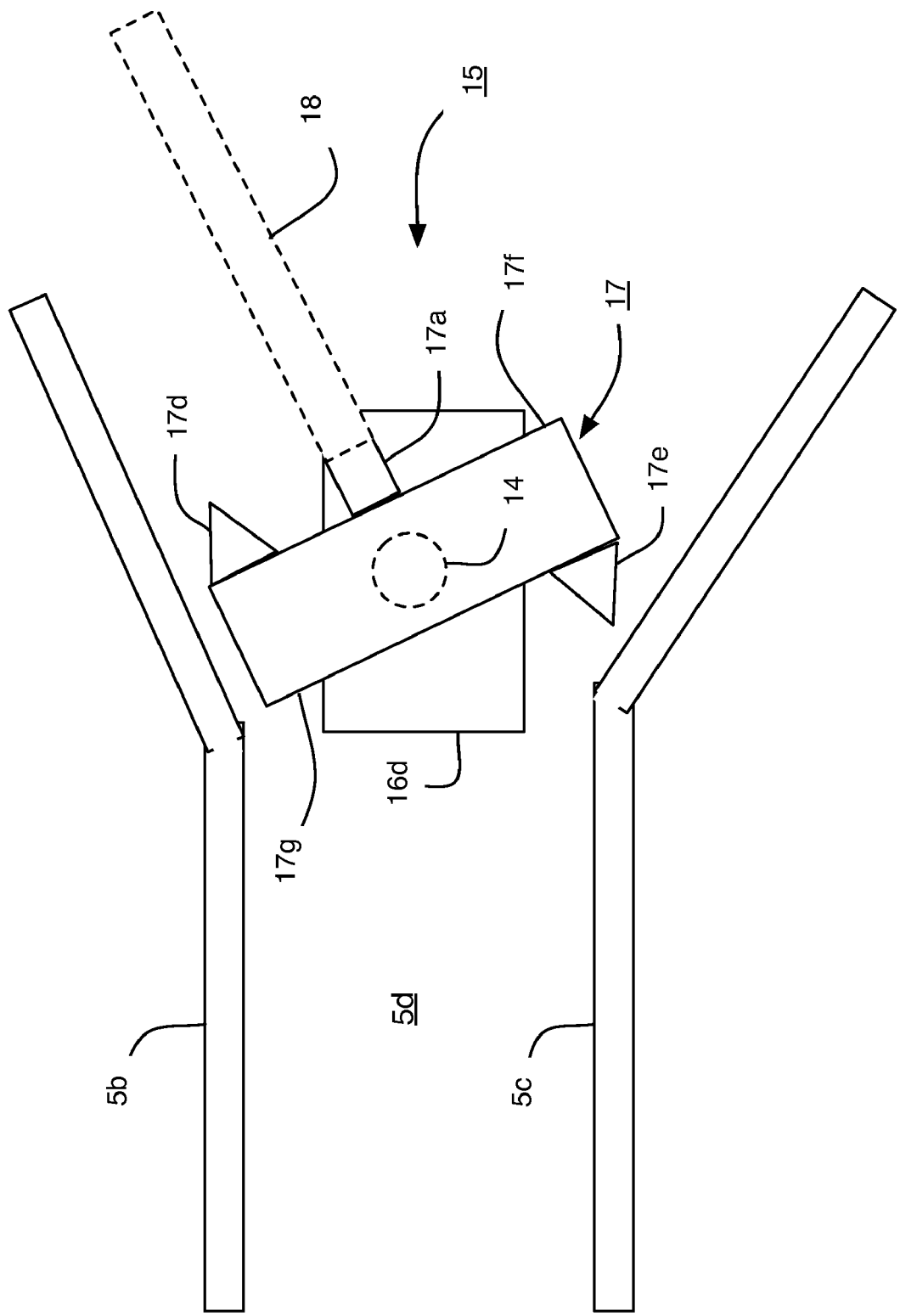
FIG. 19 is a side elevation view of adjacent data platters being impaired by the deployment body and impairment device of FIG. 18.

FIG. 19 illustrates the impairment of data platters 5b, 5c using impairment device 15. The impairment device 15 is moved to the impairment position by inserting the pivot tool 18a through the access opening 13d into the feature 16e of the deployment body 16 and rotating the tool 18a to position the impairment tool 17 within the gap 5d between the stack data platters 5b, 5c. The impairment lever 18 is then inserted through the opening 13e formed in the top or cover 4a of the enclosure of hard drive 4 and into the opening 17a of the impairment tool 17. As the impairment lever 18 moves in response to a force applied to it, the impairment tool 17 rotates or pivots relative to the deployment body 16 via pin 14, which causes the impairment tips 17d, 17e to engage the adjacent surfaces of data platters 5b, 5c, resulting in the displacement, deformation and eventual impairment of data platters 5b, 5c as shown in FIG. 19. The access opening 13e is dimensioned to permit movement of impairment lever 17 sufficient to pivot the impairment tool 17 to impair data platters 5b, 5c.

Figure 20:
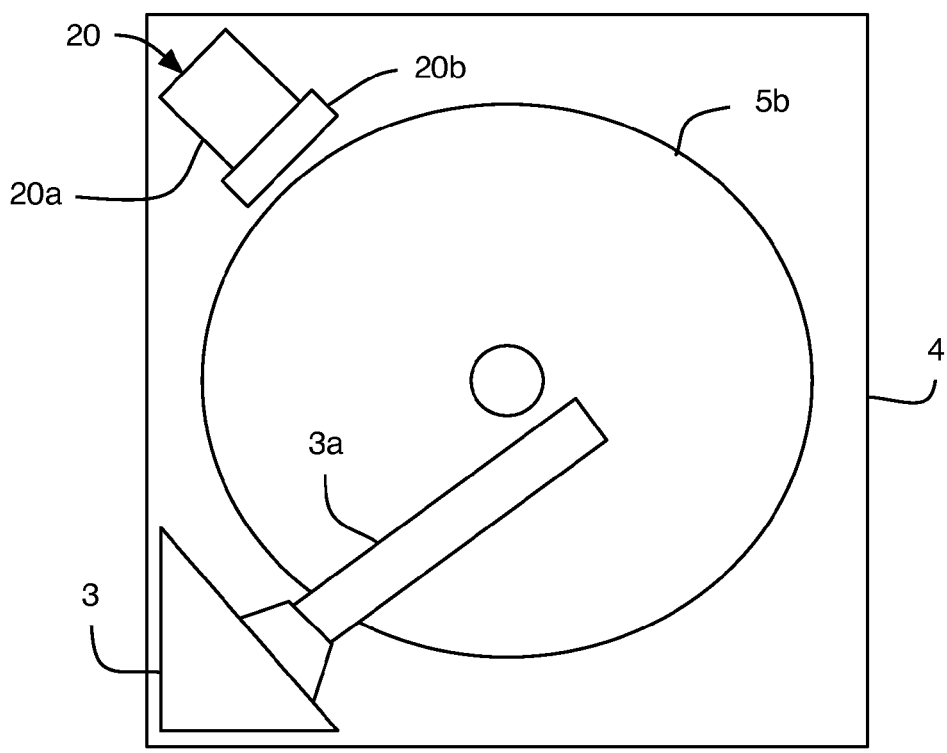
FIG. 20 is a top view of an illustrative hard drive having another embodiment of an impairment device in a stowed position.
Figure 21:
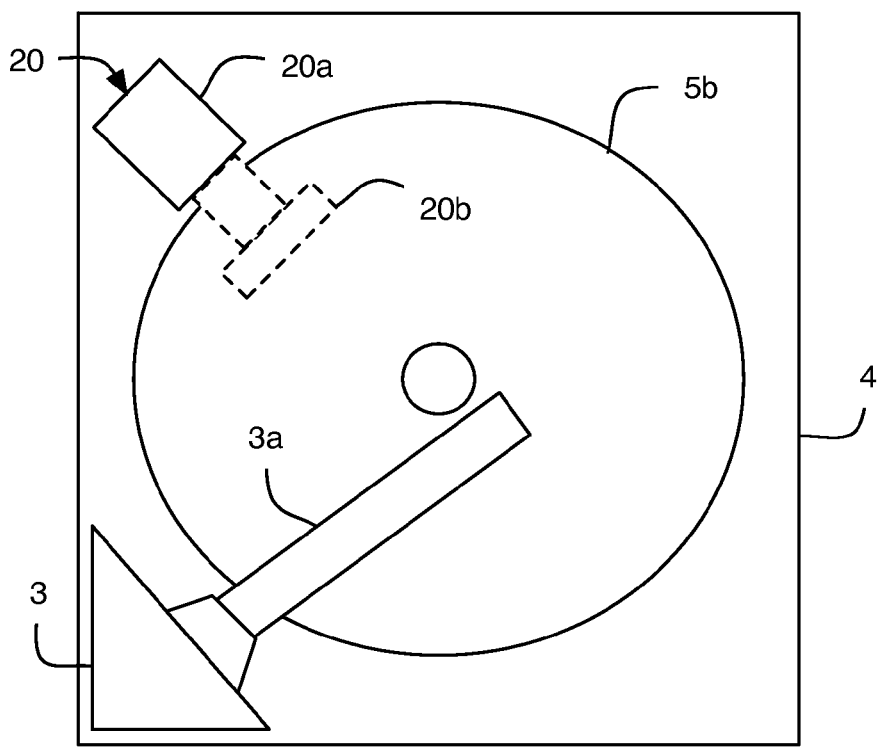
FIG. 21 is a top view of the hard drive of FIG. 20 with the impairment device in an impairment position.

FIGS. 20-29 illustrate another embodiment of a data platter impairment device 20 to impair data platters 5b, 5c within an illustrative hard drive 4. As shown in FIGS. 20 and 21, the illustrative hard drive 4 includes data platters 5b, 5c, a read-write head 3a, and a read-write base 3 mounted within an enclosure of the hard drive.

FIG. 20 illustrates the impairment device 20 in the stowed position, and FIG. 21 illustrates the impairment device 20 pivoted to the impairment position. Impairment device 20 is preferably mounted within the hard drive 4 in proximity to data platters 5b, 5c. The impairment device 20 preferably includes a tool guide 20a in which an inner impairment tool 20b is mounted. The impairment tool 20b is movable from the stowed position (FIG. 20) to the impairment position (FIG. 21).

Figure 24:
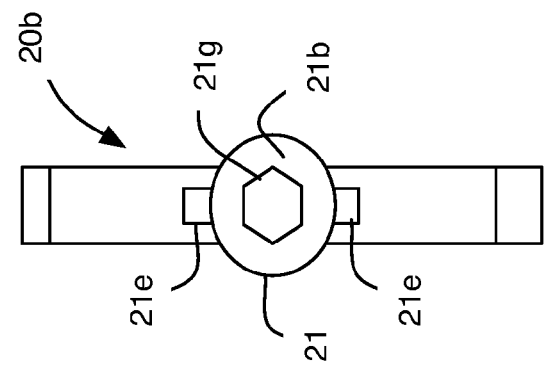
FIG. 24 is rear view of the distal end of the inner component of the impairment device of FIG. 22.
Figure 23:
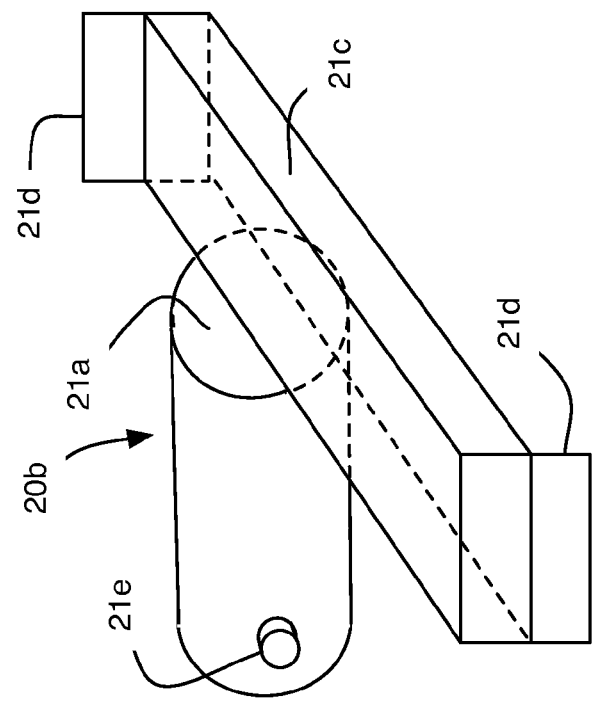
FIG. 23 is a perspective view of the head of the inner component of the impairment device of FIG. 22.
Figure 22:
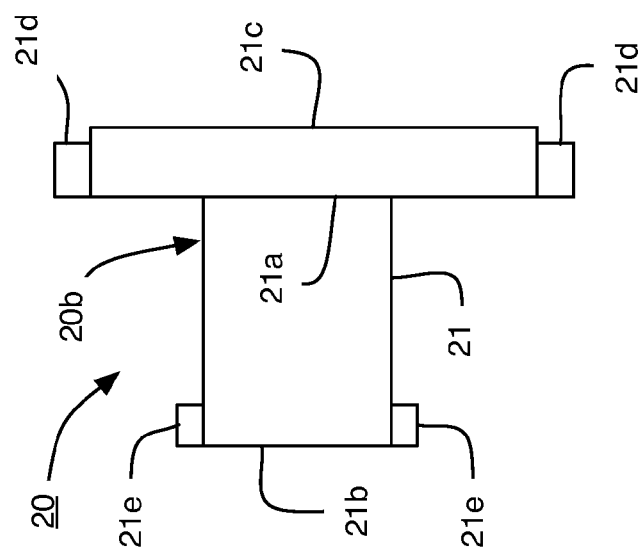
FIG. 22 is a top view of an inner component of the impairment device of FIG. 20.

FIGS. 22-24 illustrate the inner impairment tool 20b of impairment device 20. Inner impairment tool 20b preferably includes a generally cylindrical body 21 having a proximal end 21a and a distal end 21b. The proximal end 21a of the body 21 preferably terminates in an impairment head 21c. Impairment head 21c preferably includes at least two impairment tabs 21d projecting outwardly in opposing directions from opposite ends of impairment head 21c. The impairment tabs 21d are preferably made of hardened steel, but may be made of any material suitable for deforming and impairing data platters 5b, 5c.

The distal end 21b of inner impairment tool 20b preferably includes one or more guide pins 21e projecting outwardly from the body 21 to guide the body within tool guide 20a. As shown in FIG. 24, an opening 21g is preferably provided in the distal end 21b of inner impairment tool 20b for receiving a tool, such as, for example, an Allen wrench, in order to rotate, align and extend impairment tool 20b within tool guide 20a.

Figure 27:
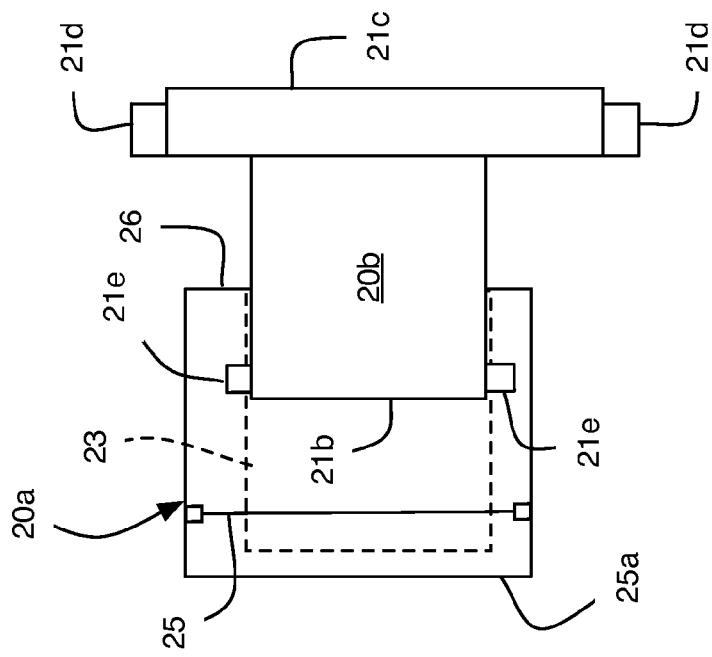
FIG. 27 is a top view of the tool guide of FIG. 25 with the inner component of the impairment device in an impairment position.
Figure 25:
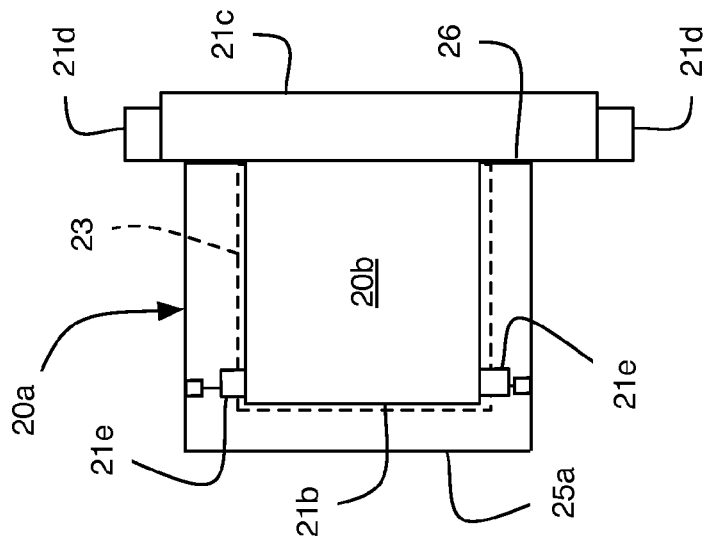
FIG. 25 is a top view of a tool guide containing the inner component of the impairment device of FIG. 22 in a stowed position.

The inner impairment tool 20b is illustrated in the stowed position within the tool guide 20a in FIG. 25 and in the impairment position in FIG. 27. Tool guide 20a preferably includes a distal end 25 and a proximal end 26. Tool guide 20a preferably has a longitudinally extending opening 23 in the proximal end 26 for receiving the inner impairment tool 20b. The opening 23 is dimensioned to permit the inner impairment tool 20b to slide within the tool guide 20a between the stowed position (FIG. 25) and the impairment position (FIG. 27).

An end plate 25a is preferably attached to the distal end 25 of the tool guide 20a to substantially enclose the opening 23. The end plate 25a preferably includes a relieved section or opening 23a that is aligned and communicates with the opening 23 within the tool guide 20a when the end plate is mounted on the tool guide.

In the stowed position (FIG. 25), the distal end 21b of inner impairment tool 20b is positioned within the opening 23 of the tool guide 20a in proximity to the distal end 25 of tool guide 20a. Impairment head 21c preferably seats itself on the proximal end 26 of tool guide 20a. In the impairment position (FIG. 27), the distal end 21b of the inner impairment tool 20b is positioned with the opening 23 of the tool guide 20a in proximity to proximal end 26 of the tool guide 20a with the impairment head 21c extended from the proximal end 26.

Figure 26:
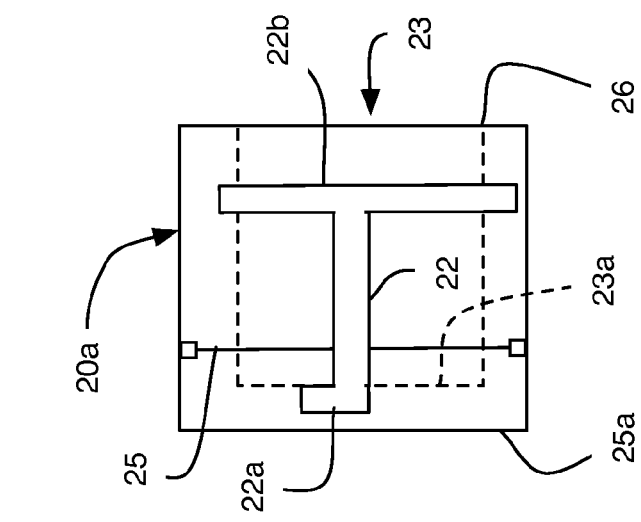
FIG. 26 is a side elevation view of the tool guide of FIG. 25 showing guide channel for positioning the inner component of FIG. 22.

FIG. 26 is a side view of the tool guide 20a without the inner impairment tool 20b. Tool guide 20a preferably includes a groove 22 that extends longitudinally along the opening 23 from at least distal end 25 to at least in proximity to the proximal end 26 of tool guide 20a. The distal end of the longitudinal groove 22 preferably terminates in a vertically extending groove or stop 22a and the proximal end of the longitudinal groove 22 preferably terminates in a vertically extending groove 22b that extends about the circumference of the opening 23 in the tool guide 20a. The grooves 22, 22a, 22b are preferably dimensioned to receive the pin 21e extending from the body 21 of the inner impairment tool 20b to guide and control the movement of the inner impairment tool within the tool guide 20a.

Figure 28:
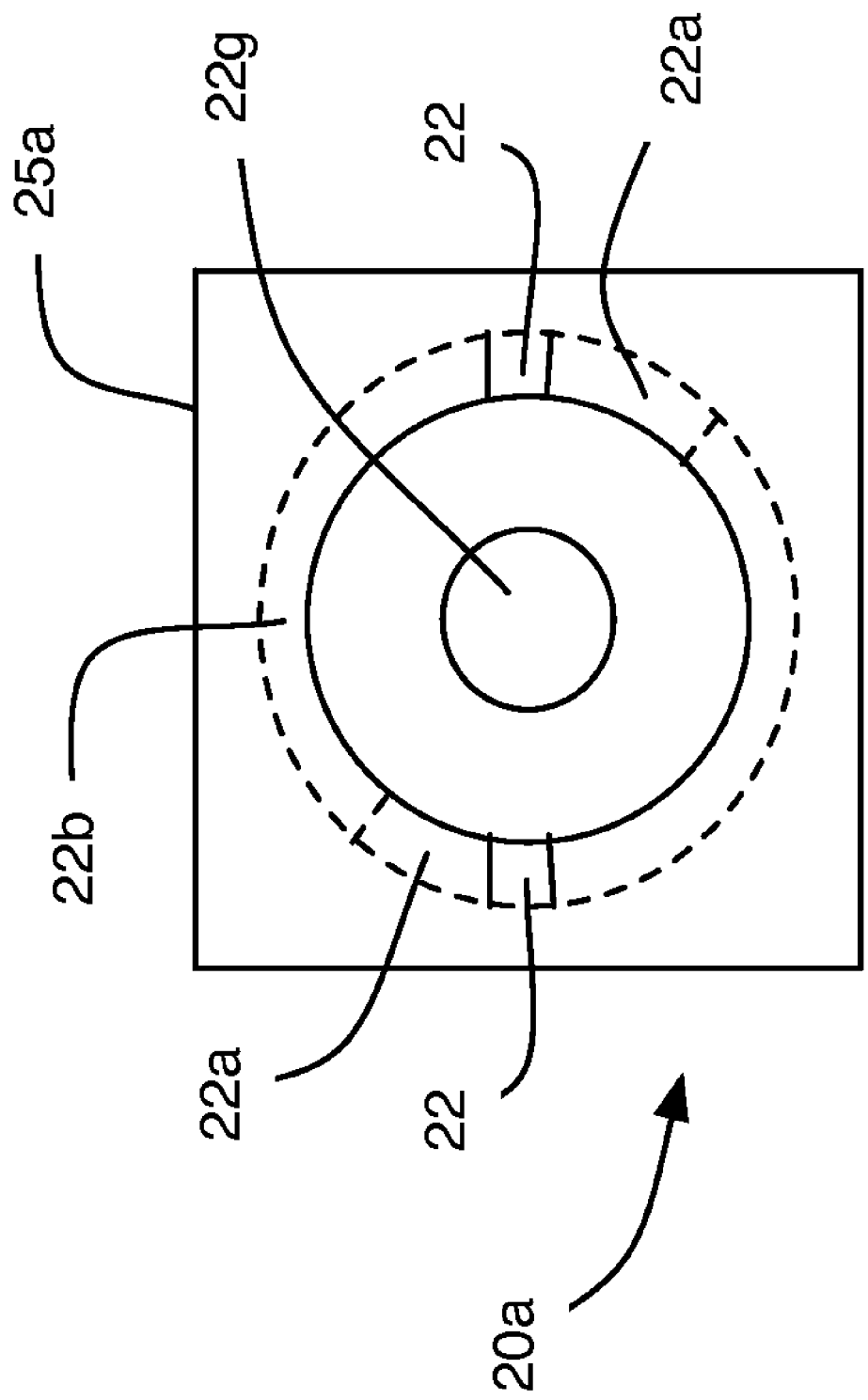
FIG. 28 is a rear view of an end plate of the tool guide of FIG. 25.

FIG. 28 illustrates a rear view of the end plate 25a positioned at the distal end 25 of the tool guide 20a. Opening 22g is preferably generally aligned with the opening 21g in the distal end 21b of inner impairment tool 20b.

In the stowed position, guide pin 21e of inner impairment tool 20b rests in the vertical groove 22a, which prevents the inner impairment tool from moving longitudinally within the tool guide 20a toward the impairment position. Inner impairment tool 20b may be moved from the stowed position to the impairment position by preferably by inserting a rotation tool (not shown), such as, for example, an Allen wrench, through the opening 22g in the end plate 25a and into the opening 21g in the distal end 21b of the impairment tool. Rotation of the rotation tool will cause the inner impairment tool 20b to rotate within the opening 23 of the tool guide 20a to a position where the guide pin 21e is aligned with the longitudinal groove 22, at which time the impairment tool 20b may slide forward into the impairment position by applying pressure with the rotation tool until the guide pin 21e engages the vertical groove 22b. The longitudinal groove 22 prevents the inner impairment tool 20b from rotating within the tool guide 20a when the guide pin 21e is located within the longitudinal groove.

Figure 29:
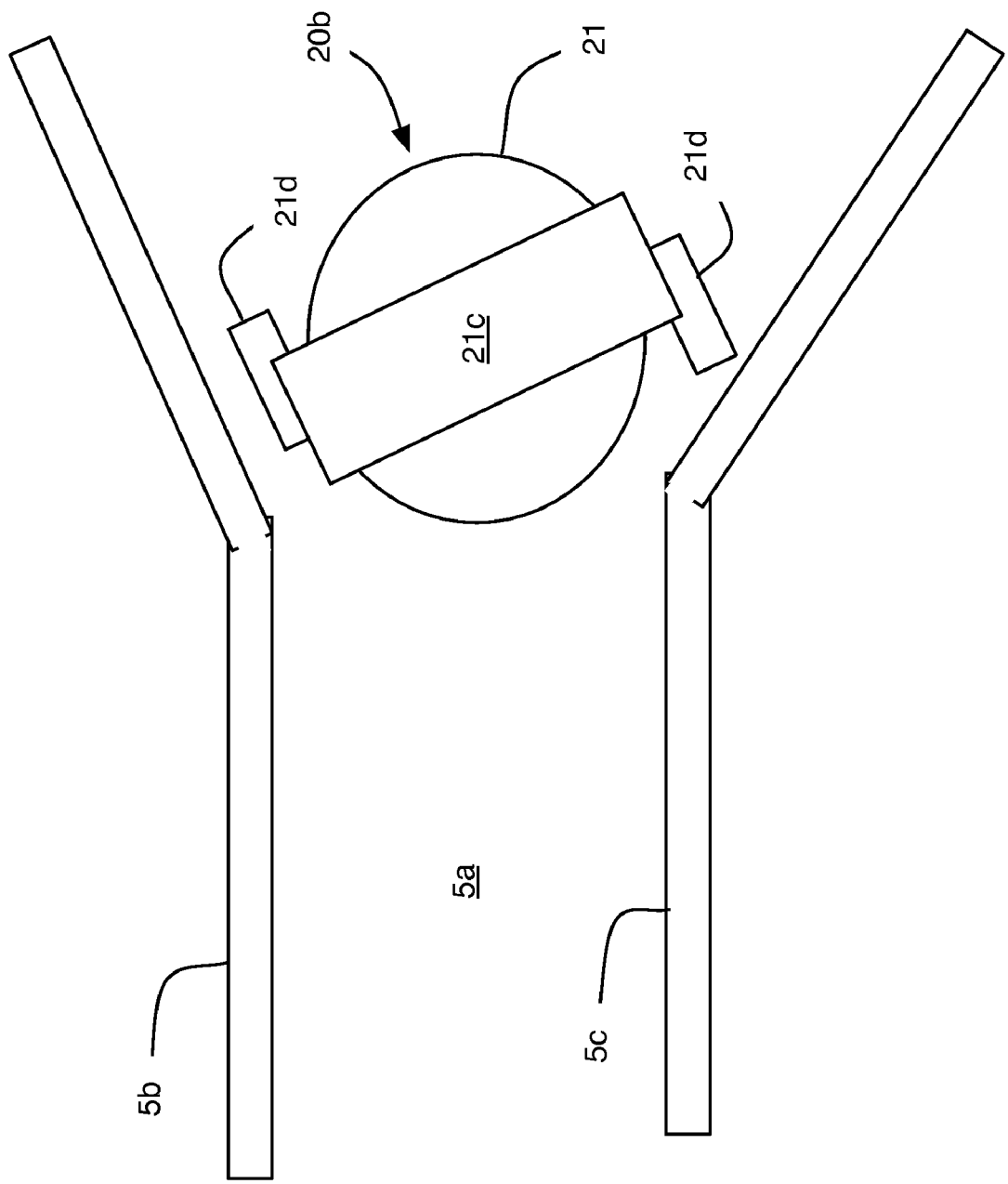
FIG. 29 is a side elevation view of adjacent data platters being impaired by the impairment device of FIG. 20.

When the guide pin 21e is aligned with the vertical groove 22b, the impairment head 21c of the inner impairment tool 20b is fully extended beyond the proximal end of the tool guide 21a so that the impairment head is positioned within the gap 5a formed between adjacent data platters 5b, 5c, as shown in FIG. 29. With the guide pin 21e aligned with the vertical groove 22b, the impairment head 21c of the inner impairment tool 20b may be rotated relative the tool guide 21a using the rotation tool so that the guide pin 21e travels within the vertical groove 22b. Rotation of the impairment head 21c causes the opposing impairment tabs 21d on the impairment head to engage adjacent surfaces of the data platters 5b, 5c, resulting in the displacement and eventual impairment of data platters 5b, 5c as shown in FIG. 29.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A system for impairing at least one pair of data platters stacked parallel to each other in a hard drive, comprising:
   a hard drive enclosure in which the data platters are mounted;
   an alignment device pivotably mounted within the hard drive enclosure, the alignment device including an upper arm and a lower arm, the upper and lower arms being spaced apart from and extending parallel to one another, wherein the alignment device is movable between a stowed position in which the alignment device is spaced apart from the data platters to an impairment position in which the upper and lower arms of the alignment device overlay at least an edge of the data platters; and the upper arm including an opening for receiving an impairment tool, the opening being generally aligned with an impairment opening formed in the enclosure when the alignment device is in the impairment position;

wherein the impairment tool is inserted through the impairment opening formed in the enclosure and the opening in the upper arm for engaging a surface of the data platters to impair the data platters.

* * * * *